(12) United States Patent
Gartzke et al.

(10) Patent No.: US 9,341,148 B2
(45) Date of Patent: May 17, 2016

(54) EVAPORATIVE EMISSIONS FUEL SYSTEM

(71) Applicant: Briggs & Stratton Corporation, Wauwatosa, WI (US)

(72) Inventors: Chad J. Gartzke, Richfield, WI (US); Jacob Schmalz, Milwaukee, WI (US); Carl T. Tiefenthaler, Jackson, WI (US); Paul A. Leech, Wauwatosa, WI (US); Kenneth Breitenstein, Cedarburg, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 14/152,701

(22) Filed: Jan. 10, 2014

(65) Prior Publication Data
US 2014/0216424 A1   Aug. 7, 2014

Related U.S. Application Data

(60) Provisional application No. 61/760,555, filed on Feb. 4, 2013.

(51) Int. Cl.

| | |
|---|---|
| *F02M 33/02* | (2006.01) |
| *F02M 25/08* | (2006.01) |
| *F02M 37/00* | (2006.01) |
| *F02M 35/04* | (2006.01) |
| *A01D 34/82* | (2006.01) |
| *F02B 63/02* | (2006.01) |

(52) U.S. Cl.
CPC ........... *F02M 25/0872* (2013.01); *A01D 34/82* (2013.01); *F02M 35/048* (2013.01); *F02M 37/0076* (2013.01); *F02B 63/02* (2013.01)

(58) Field of Classification Search
CPC .......... F02M 25/0854; F02M 25/0872; F02M 25/089; F02M 35/04; F02M 1/16; F02M 2025/0863; F02M 25/08; F02M 35/048; F02M 37/0076; B60K 2015/03576
See application file for complete search history.

(56) References Cited

U.S. PATENT DOCUMENTS

| | | | | | |
|---|---|---|---|---|---|
| 3,763,839 | A | * | 10/1973 | Alquist | ................ F02M 25/089 123/519 |
| 3,884,204 | A | * | 5/1975 | Krautwurst | ...... B60K 15/03504 123/519 |
| 4,418,662 | A | * | 12/1983 | Engler et al. | ..................... 96/133 |
| 4,646,701 | A | | 3/1987 | Fukumoto | |
| 4,813,453 | A | * | 3/1989 | Jenkins et al. | ................. 137/588 |
| 4,877,001 | A | | 10/1989 | Kenealy et al. | |
| 4,886,096 | A | | 12/1989 | Reddy | |
| 5,183,023 | A | * | 2/1993 | Hanson | ......................... 123/520 |
| 5,408,977 | A | * | 4/1995 | Cotton | ............. B60K 15/03504 123/516 |
| 5,819,796 | A | * | 10/1998 | Kunimitsu et al. | ........... 137/587 |

(Continued)

*Primary Examiner* — Marguerite McMahon
*Assistant Examiner* — Tea Holbrook
(74) *Attorney, Agent, or Firm* — Foley & Lardner LLP

(57) ABSTRACT

An engine includes a fuel tank with a fuel tank body defining an internal fuel tank volume for containing a fuel, a vent conduit integrally formed with the fuel tank body, and an air cleaner system including an air cleaner housing defining an internal air cleaner volume. The vent conduit extends between an inlet aperture and an outlet aperture. The inlet aperture is in fluid communication with the internal fuel tank volume. An opening is formed in the air cleaner housing and the vent conduit extends through the opening. The outlet aperture of the vent conduit is positioned within the internal air cleaner volume and the vent conduit provides fluid communication between the internal fuel tank volume and the internal air cleaner volume.

12 Claims, 5 Drawing Sheets

(56) References Cited

U.S. PATENT DOCUMENTS

| | | | | |
|---|---|---|---|---|
| 5,850,819 | A * | 12/1998 | Kunimitsu et al. | 123/520 |
| 5,964,204 | A | 10/1999 | Freeland | |
| 6,786,207 | B2 * | 9/2004 | Kojima et al. | 123/516 |
| 7,021,249 | B1 * | 4/2006 | Christison | F02B 43/10 123/3 |
| 7,159,577 | B2 | 1/2007 | Haskew et al. | |
| 7,185,640 | B2 * | 3/2007 | Shears | F02M 25/0854 123/519 |
| 7,311,088 | B1 | 12/2007 | Callahan et al. | |
| 7,344,586 | B2 * | 3/2008 | Zulauf et al. | 95/143 |
| 7,416,585 | B2 * | 8/2008 | Hirata | 96/135 |
| 7,435,289 | B2 * | 10/2008 | Shears | F02M 25/0854 123/519 |
| 7,527,045 | B2 * | 5/2009 | Chung | 123/519 |
| 7,578,285 | B2 * | 8/2009 | Buelow et al. | 123/516 |
| 7,608,137 | B2 * | 10/2009 | Oda | 96/134 |
| 7,717,094 | B2 * | 5/2010 | Yamamoto | F02M 25/089 123/518 |
| 7,998,258 | B2 * | 8/2011 | Goto et al. | 96/134 |
| 8,156,924 | B2 | 4/2012 | Hudak et al. | |
| 2001/0052292 | A1 * | 12/2001 | Ito | 96/134 |
| 2002/0189877 | A1 * | 12/2002 | Yagisawa | B62J 1/12 180/219 |
| 2006/0108369 | A1 * | 5/2006 | Hirose | B62J 35/00 220/567.2 |
| 2007/0068388 | A1 * | 3/2007 | Shears | F02M 35/024 96/134 |
| 2008/0251053 | A1 * | 10/2008 | Shears | F02M 25/0854 123/518 |
| 2008/0251055 | A1 * | 10/2008 | Schmalz | F02M 25/0854 123/519 |
| 2010/0243355 | A1 * | 9/2010 | Hosoya | B62J 37/00 180/69.4 |
| 2014/0217689 | A1 * | 8/2014 | Rumao et al. | 280/47.33 |

* cited by examiner

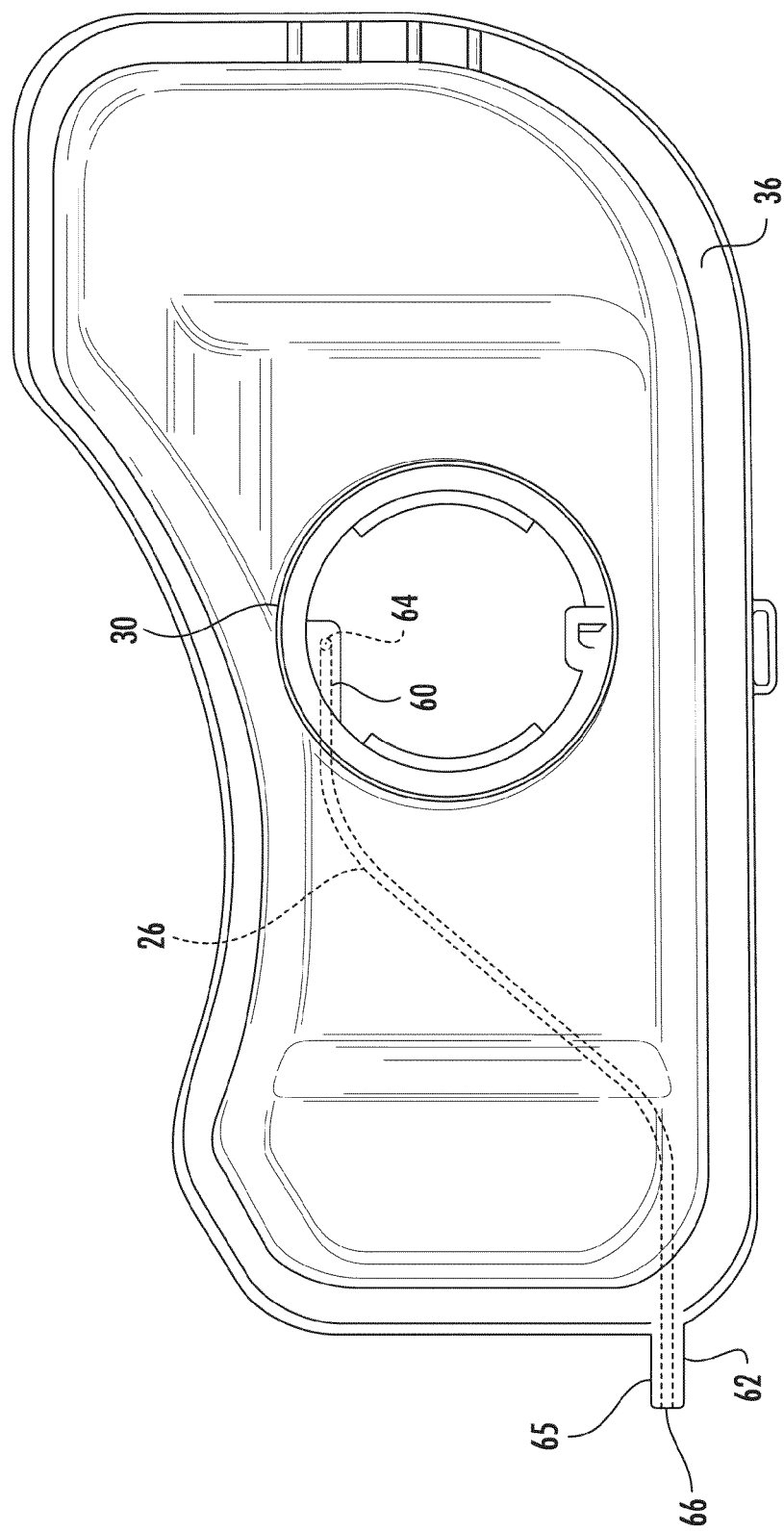

EVAPORATIVE EMISSIONS FUEL SYSTEM

CROSS-REFERENCE TO RELATED PATENT APPLICATIONS

This application claims the benefit of U.S. Provisional Application No. 61/760,555, filed Feb. 4, 2013, which is incorporated herein by reference in its entirety.

BACKGROUND

Internal combustion engines are often used to power small equipment such as lawnmowers, tillers, snow throwers, lawn tractors, pressure washers, generators, other outdoor power equipment, etc. The fuel system for these internal combustion engines includes a fuel tank, in which fuel is stored for use. Generally, the volatility of the fuel allows for a portion of the fuel to evaporate and mix with air within the fuel tank. Changes in temperature, such as those between daytime and evening, as well as "sloshing" during use can cause an increase or a decrease in the amount of fuel vapor in the tank as well as an increase or decrease in the pressure within the tank.

The fuel tank cap often includes a fuel vapor filtering element. This filtering element may include an activated carbon bed, which filters the fuel vapor from the air to substantially reduce or eliminate any fuel vapor emissions from the fuel system. Alternatively, filtering elements may be located in areas of the system other than the fuel tank cap (e.g., dedicated carbon canisters within the fuel tank or in-line with the fuel delivery passage). Regardless of where the filtering element is located, these components add cost and complexity to the fuel system in order to control evaporative emissions.

Other systems for controlling fuel vapor utilize a flexible conduit or hose that is in communication with a vapor space of the fuel tank and which delivers fuel vapor to an air cleaner or carburetor system to enable the engine to "burn" evaporative emissions from the fuel tank when the engine is operating. However, these systems suffer from cost and manufacturing complexity issues related to running a substantial length of conduit or flexible between the fuel tank and the air cleaner or carburetor system.

SUMMARY

One embodiment of the invention relates to an engine including a fuel tank with a fuel tank body defining an internal fuel tank volume for containing a fuel, a vent conduit integrally formed with the fuel tank body, and an air cleaner system including an air cleaner housing defining an internal air cleaner volume. The vent conduit extends between an inlet aperture and an outlet aperture. The inlet aperture is in fluid communication with the internal fuel tank volume. An opening is formed in the air cleaner housing and the vent conduit extends through the opening. The outlet aperture of the vent conduit is positioned within the internal air cleaner volume and the vent conduit provides fluid communication between the internal fuel tank volume and the internal air cleaner volume.

Another embodiment of the invention relates to a fuel tank including a top portion and a bottom portion. The top portion includes a filler neck extending along a filler neck axis that is angled relative to a vertical axis, and a top portion mounting surface perpendicular to the filler neck axis. The bottom portion includes a bottom portion mounting surface perpendicular to the filler neck axis. The top portion is attached to the bottom portion with the top portion mounting surface engaging the bottom portion mounting surface.

Another embodiment of the invention relates to an engine including a fuel tank including a fuel tank body defining an internal fuel tank volume for containing a fuel; an air cleaner system including an air cleaner housing defining an internal air cleaner volume; and a vent conduit integrally formed with the fuel tank body conduit. The vent conduit establishes direct fluid communication between the internal fuel tank volume and the internal air cleaner volume. The engine does not include an activated carbon filter for filtering fuel vapor emanating from the internal fuel tank volume.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, wherein like reference numerals refer to like elements.

FIG. 8 is a top view of the top portion of the fuel tank illustrating the vent conduit of the fuel assembly of FIG. 2.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
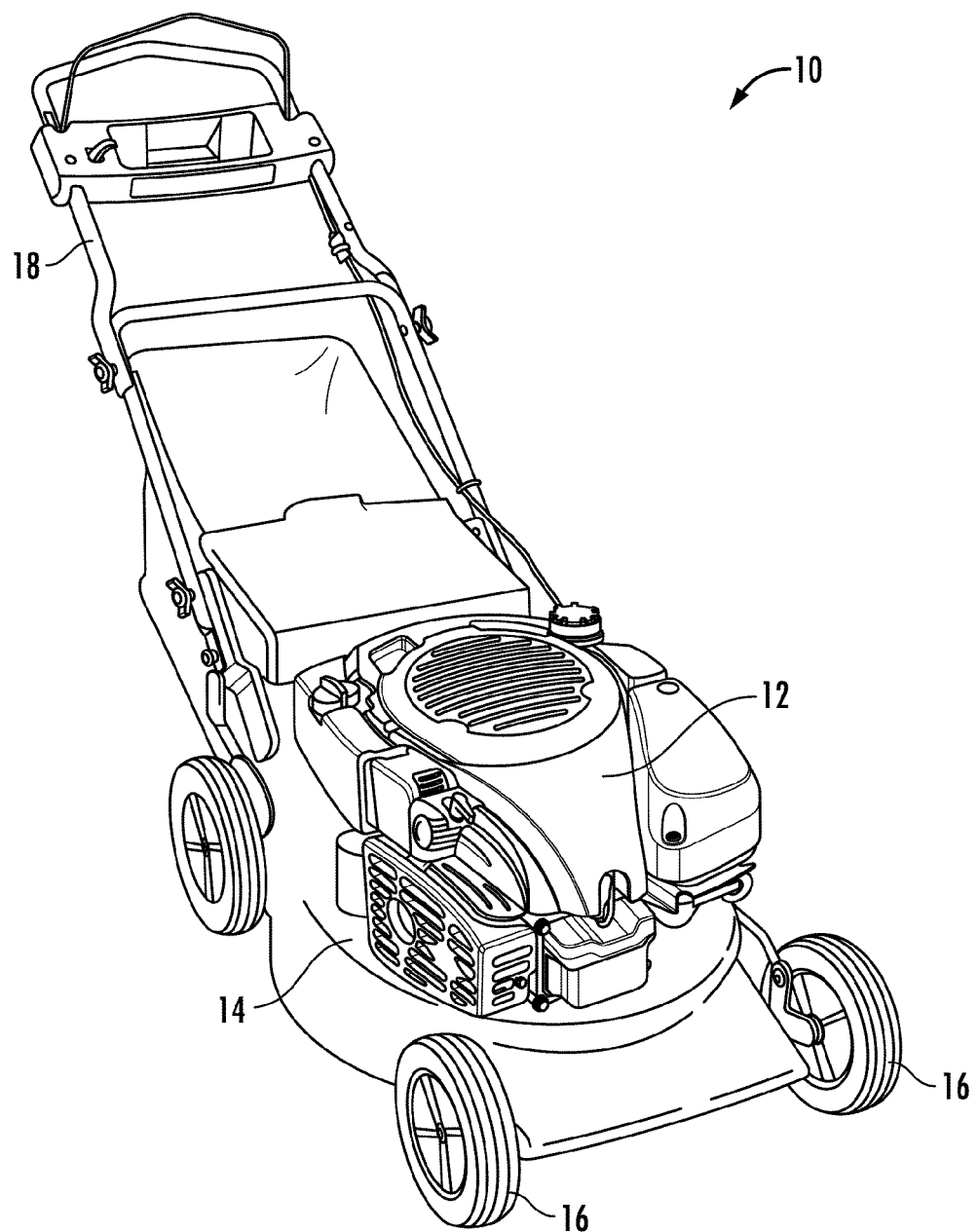
FIG. 1 is a perspective view of a lawn mower.

Referring to FIG. 1, according to an exemplary embodiment, outdoor power equipment, in the form of a lawn mower 10, includes an internal combustion engine 12 coupled to a rotary tool, such as a blade in a deck 14 of the lawn mower 10, an auger, a saw, tines, a drill, a pump, or other rotary tools. The lawn mower 10 further includes wheels 16 and a rearward extending handle 18 designed to be pushed by an operator walking behind the lawn mower 10. In other contemplated embodiments, the outdoor power equipment may be in the form of a rotary tiller, a pressure washer, a snow thrower, a lawn tractor or riding mower, an edger, a portable generator, or other equipment, with a corresponding powered tool, such as tines, a pump, an auger and impeller, an alternator, a drive train, or other tools.

Figure 2:
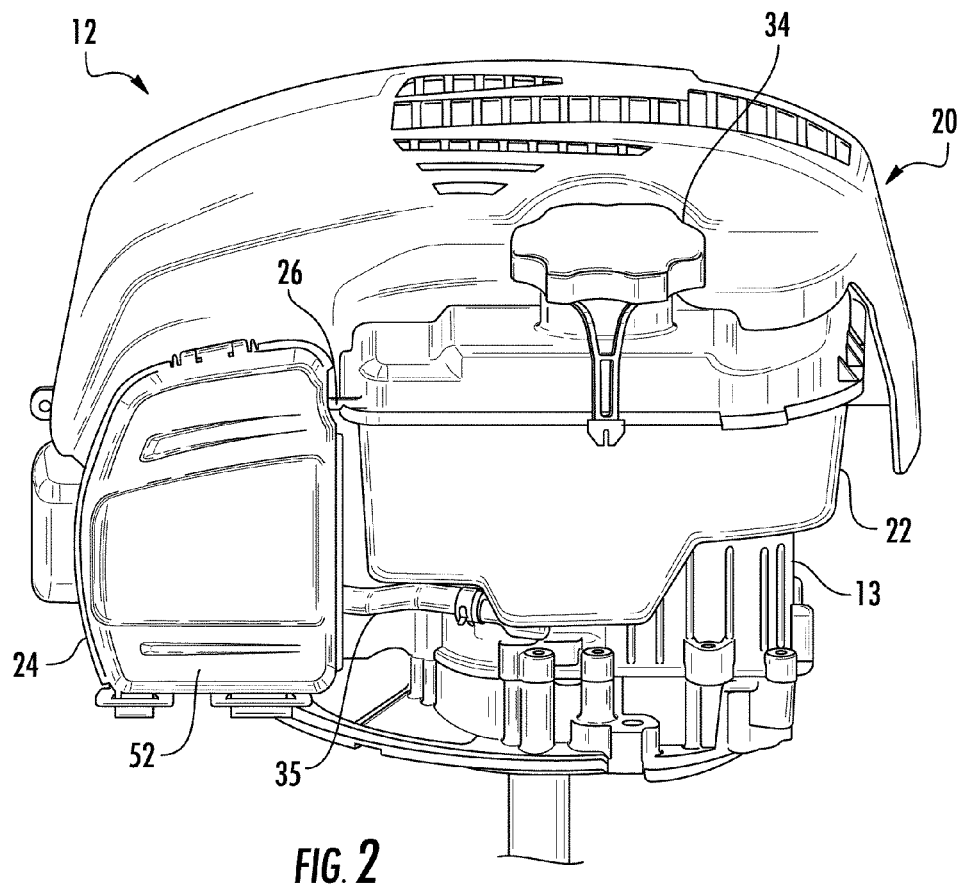
FIG. 2 is a side view of an engine including a fuel system assembly.

Referring to FIG. 2, according to an exemplary embodiments, the engine 12 is shown according to an exemplary embodiment as a small, single-cylinder, gasoline-powered, four-stroke cycle internal combustion engine. However a broad range of engines and other fluid holding components may benefit from the teachings disclosed herein. In some embodiments, the engine 12 is vertically shafted (as shown in FIGS. 1-2), while in other embodiments, an engine is horizontally shafted. For example, in some contemplated embodiments, the engine may include two, three, or more cylinders, may be a diesel engine, or may have a two-stroke cycle.

During operation of the engine 12, a piston translates back and forth within a cylinder block 13, powered by combustion processes. As the piston translates, a connecting rod coupled to the piston drives a crankshaft of the engine 12. The combustion process consumes a fuel/air mixture that is provided to the engine 12 by a fuel system 20. According to an exemplary embodiment, the fuel is a fluid that may vaporize at environmental conditions (e.g., temperature, air pressure, etc.) at which the lawn mower 10 is operated.

The engine 12 may produce emissions of volatile hydrocarbons that are not related to the exhaust of the engine 12. Instead, the emissions result from the vaporization of the fuel prior to combustion (e.g., fuel in the fuel system 20). These emissions can include, for example, running loss emissions that occur as the fuel system 20 is heated during operation of the engine 12, and diurnal losses that occur due to the heating of the fuel system by environmental conditions (e.g., elevated temperatures during the day). Some countries, states, regions, and municipalities have regulations governing the acceptable amount of emissions.

Figure 3:
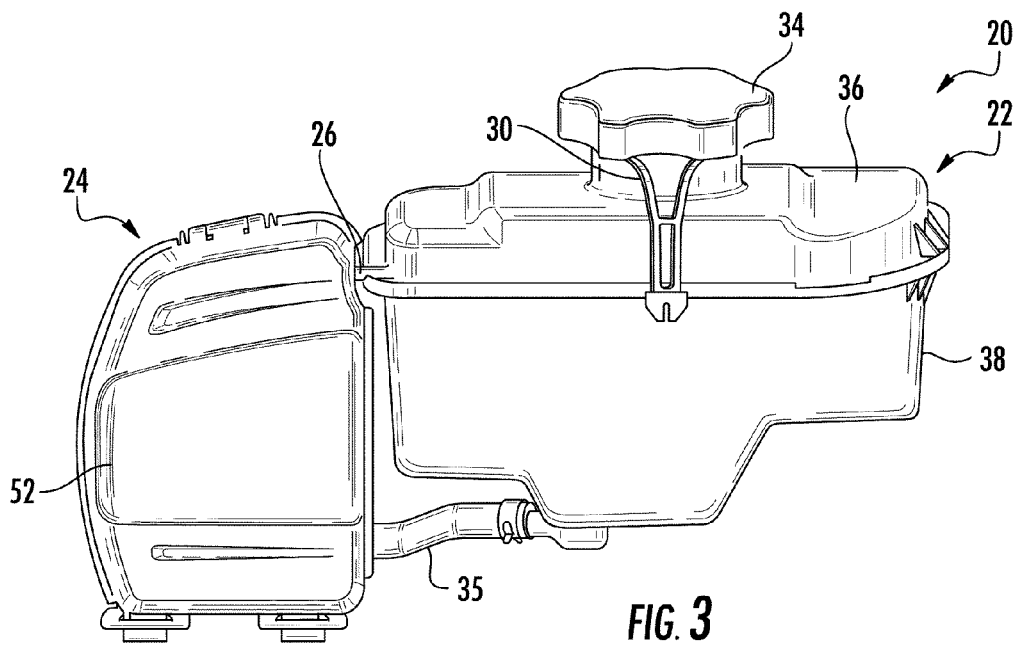
FIG. 3 is a front view of the fuel system assembly of FIG. 2.

Referring to FIG. 3, according to an exemplary embodiment, the fuel system 20 is shown to include a fuel tank 22 and an air cleaner system including an air cleaner housing 24. The fuel system 20 is configured to control the evaporative emissions of the internal combustion engine by redirecting vaporized fuel from the fuel tank 22 to the air cleaner housing 24 through a vent conduit 26, thereby reducing the emissions of the engine 12.

Figure 4:
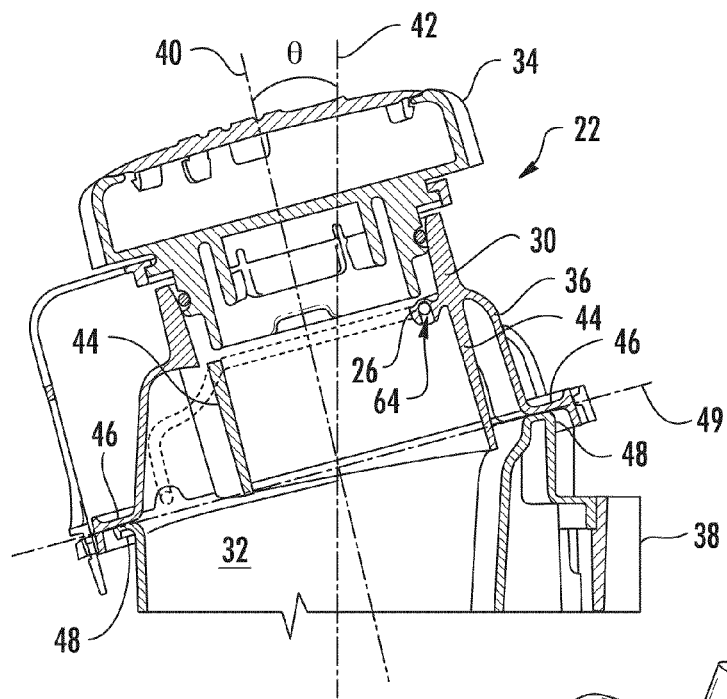
FIG. 4 is a cross-sectional right side view of the angled fuel neck of the fuel system assembly of FIG. 2.

Referring to FIG. 4, according to an exemplary embodiment, the fuel tank 22 is a hollow body with an internal fuel tank volume 32. Fuel is poured into the fuel tank 22 through a fill neck 30. The open end of the fill neck 30 is closed with a fuel cap 34 that is removably coupled to the open end of the fill neck 30 via a threaded connection or the like. The fuel tank 22 and the fuel cap 34 form a substantially sealed structure, such that fuel vapor cannot escape the internal volume 32 through the interface between the fuel tank 22 and the fuel cap 34 or elsewhere and fuel vapor is instead directed through the vent conduit 26. The fill neck 30 is angled (e.g., inclined at an angle relative to vertical when the engine 12 is in a normal operating orientation). The fill neck 30 is angled outward from the engine 10 to facilitate the filling of the fuel tank 22 by a user. Because the fill neck 30 is angled, the user is better able to view the internal volume 32 of the fuel tank 22 (e.g., to determine the fill level of the fuel tank 22). Also, it is easier to guide the spout of a gas can or other dispenser into the angled fill neck than into a vertically oriented fill neck. The fuel is delivered from the fuel tank 22 to the air/fuel mixing apparatus (e.g. a carburetor, not shown) via a fuel line 35.

Figure 5:
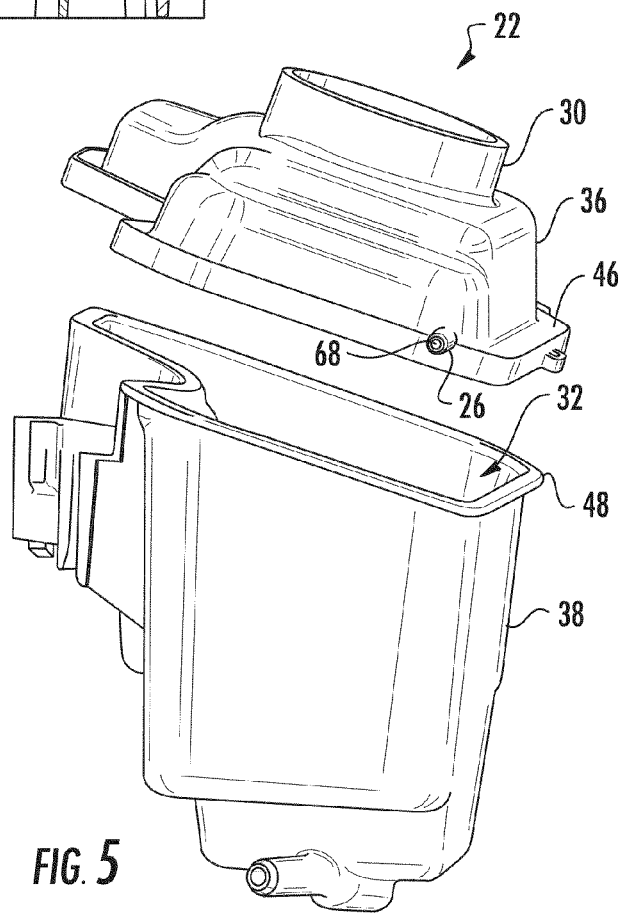
FIG. 5 is an exploded left side view of the fuel tank of the fuel system assembly of FIG. 2.
Figure 6:
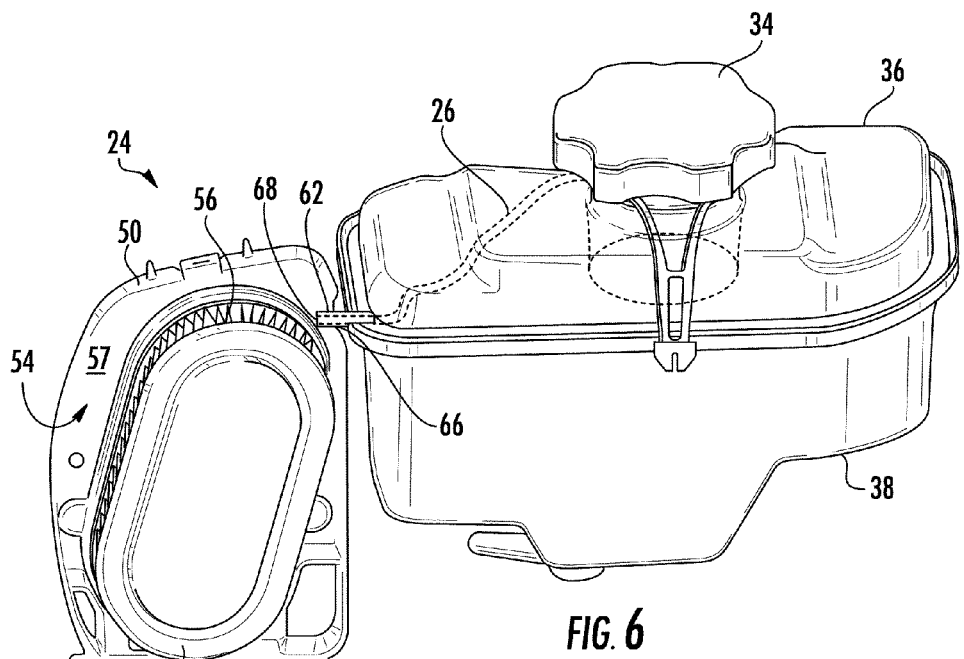
FIG. 6 is a side perspective view of the fuel system assembly of FIG. 2 with the cover of the air cleaner housing.

Referring to FIGS. 4-6, according to an exemplary embodiment, the fuel tank 22 includes a top portion 36 and a bottom portion 38. In some embodiments, the bottom portion 38 has an internal volume that is greater than the internal volume of the top portion 36. The top portion 36 of the fuel tank 22 includes the fill neck 30, which extends away from the main body of the fuel tank 22 along a fill neck axis 40, which is angled relative to a vertical axis 42 by an angle $\theta$. In some embodiments, the angle $\theta$ is between approximately 0 degrees and 45 degrees. In some embodiments, the angle $\theta$ is between approximately 10 degrees and 20 degrees. In some embodiments, the angle is approximately 15 degrees. Other portions of the top portion 36, such as interior walls 44 defining an interior volume for the fill neck 30 may also be angled relative to the vertical axis 42, parallel to the fill neck axis 40. The bottom end of the top portion 36 includes a mounting surface, shown as a surface of an outwardly extending flange 46 (e.g., lip, edge, ridge, etc.). The mounting surface defines a plane 49 that is perpendicular to the fill neck axis 40. The bottom portion 38 includes a mounting surface, shown as a surface of an outwardly extending flange 48 (e.g., lip, edge, ridge, etc.). The flange 48 is perpendicular to the fill neck axis 40. Consequently, the flanges 46 and 48 are equally angled relative to the vertical axis 42 of the fuel tank 22 along an axis 47.

According to an exemplary embodiment, the top portion 36 is formed by injection molding. Aligning components (e.g., the interior walls 44) in the same direction as the fill neck axis 40 or perpendicular to the fill neck axis 40 (e.g., the flange 48) allows the top portion 36 to be formed using an injection molding process that does not require one or more sliding cores to create the fill neck angled relative to vertical with respect to the remainder of the top portion. In this way, manufacture of the fuel tank 22 with the angled fill neck 30 is simplified and the manufacturing costs and complexity of the fuel tank 22 are reduced.

The top portion 36 and the bottom portion 38 are coupled to one another to form the fuel tank 22 by fixing the mounting surface formed by the flange 46 to the mounting surface formed by the flange 48. According to an exemplary embodiment, the flange 46 and the flange 48 are coupled together with a welding process (e.g., resistance welding, ultrasonic welding, friction welding, laser welding), heat staking, mechanical fasteners (e.g., threaded fasteners, clips, etc.) or any other coupling mechanism that creates a sealed interface preventing the egress of liquid or vaporized fuel from the internal volume 32 of the fuel tank 22.

Figure 7:
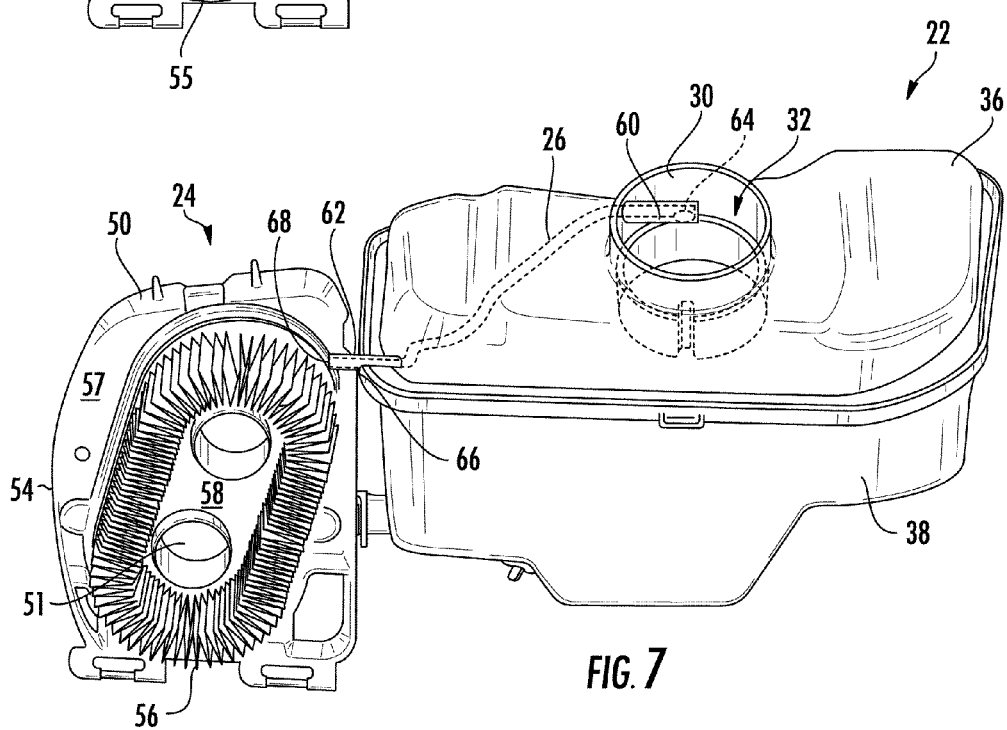
FIG. 7 is a side perspective view of the fuel system assembly of FIG. 2 with the cover of the air cleaner housing removed and with the internal air filter cover removed.

Referring to FIGS. 6-7, the internal components of the air cleaner system are shown according to an exemplary embodiment. The housing 24 of the air cleaner system is formed by a base 50 and a cover 52 (see FIG. 2) coupled to the base 50 to define an internal volume 54. An air filter 56 is positioned within the internal volume 54 (e.g., coupled to the base 50) and divides the internal volume 54 into a dirty side 57 (i.e., non-filtered side, upstream side) and a clean side 58 (i.e., filtered side, downstream side). In some embodiments, as illustrated in FIG. 6, the air filter 56 includes a pleated element that is permeable to air but largely prevents the ingress of dust and other contaminants from the dirty side 57 to the clean side 58. Referring to FIG. 7, in one embodiment, an internal cover 55 may be coupled to the air filter 56. The base 50 is coupled to the air/fuel mixing apparatus of the internal combustion engine via a duct or other component that directs a stream of air from an outlet 51 in fluid communication with the clean side 58 of the air cleaner system to the air/fuel mixing apparatus.

Referring to FIGS. 7-8, the vent conduit 26 is shown according to an exemplary embodiment. The vent conduit 26 extends from a first end portion 60 proximate to the fill neck 30 to a second end portion 62 extending away from the fuel tank 22. The vent conduit 26 is integrally formed (i.e., formed as a single, continuous, unitary component) with the top portion 36 of the fuel tank 22. According to some embodiments, the vent conduit 26 is formed as a component of the top portion 36 via a gas-assist process during the injection molding of the top portion 36. In gas assist plastic injection molding, a pressurized gas such as nitrogen is injected in a strategic location within the mold cavity. The pressurized gas displaces the injected material (e.g., plastic) along the path of least resistance. The mold for the stop portion 36 is designed so that the path of least resistance is along the vent conduit 26 so that gas-assist forms the hollow internal passage in the vent conduit 26. This allows for simplified assembly and reduced cost of the overall fuel system 20.

The vent conduit 26 has an internal passage (e.g., within a generally circular cross-section) that extends from the first end portion 60 and the second end portion 62. In other exemplary embodiments, the vent conduit 26 may be otherwise shaped. For example, the vent conduit 26 may have a generally rectangular cross-section or may be a plenum air space formed between an interior wall and the outer wall of the top portion 36. In some embodiments, the vent conduit 26 is integrally formed with the top wall of the top portion 36 and extends along the inner surface of the top wall from the fill neck 30, which is located at an interior portion of the top portion 36, to a peripheral edge of the top portion 36 proximate to the flange 46. The cross-section of the vent conduit 26 may be generally constant over the length of the vent conduit 26 or may vary (e.g., vary in shape and/or size) over the length of vent conduit 26.

According to an exemplary embodiment, the first end portion 60 of the vent conduit 26 extends inwardly from an interior wall 44 into the internal volume of the fill neck 30. The first end portion 60 includes an inlet aperture 64 that is in fluid communication with the internal fuel tank volume 32. The inlet aperture 64 enables fuel vapors to enter the vent conduit 26. The placement and size of the inlet aperture 64 may vary dependent upon the size of the fuel tank 22 and the design of the fuel system 20. Referring to FIGS. 3 and 8, in some embodiments, the inlet aperture 64 is an opening formed in the first end portion 60 of the vent conduit 26. As shown in FIG. 4, in some embodiments, the lower portion of the vent conduit 26 near the inlet aperture 64 is open to allow fuel vapors into the vent conduit 26. Fuel vapors that have risen within the fuel tank 22 may pass through the inlet aperture 64 and into the internal passage formed by the vent conduit 26.

An external portion 65 of the vent conduit 26 including the second end portion 62 is positioned away from the body of the fuel tank 22. In the assembled fuel system 20, the external portion 65 is received in an opening 66 in the air cleaner housing 24 and extends into the internal volume 54 of the air cleaner housing 24 so that the second end portion 62 is positioned within the internal volume 54. According to some embodiments, the opening 66 is formed in the base 50. In other embodiments, the opening 66 may be formed in the cover 52 or may be formed in both the base 50 and the cover 52. In some embodiments, a sealing member (e.g., gasket) is provided in the opening 66 in the space between the vent conduit 26 and the base 50 and/or the cover 52. In other embodiments, a sealing member may not be provided between the vent conduit 26 and base and/or the cover 52. According to an exemplary embodiment, the vent conduit 26, as well as the integrally formed top portion 36, are rigid bodies (e.g., formed from a relatively rigid material and having a cross-sectional shape that resists bending deformation under incidental loads). The rigid nature of the vent conduit 26 minimizes the likelihood that the internal passage formed by the vent conduit 26 is obstructed by a kink or bend in the vent conduit 26.

The second end portion 62 includes an outlet aperture 68 that is in fluid communication with the internal air cleaner volume 54. The outlet aperture 64 enables fuel vapors to exit the vent conduit 26 into the internal air cleaner volume 54. The vent conduit 26, through the inlet aperture 64 and the outlet aperture 68, provides fluid communication between the internal fuel tank volume 32 and the internal air cleaner volume 54, which are otherwise isolated from one another. The placement and size of the outlet aperture 68 may vary dependent upon the configuration of the air cleaner housing 24 and the design of the fuel system 20. Referring to FIG. 4, according to some embodiments, the outlet aperture 68 is an opening in the second end portion 62 of the vent conduit 26. Fuel vapors that have risen within the fuel tank 22 may therefore pass through the inlet aperture 64 and into the internal passage formed by the vent conduit 26. In other embodiments, the outlet aperture may be an opening in the upper portion of the second end portion 62 or may include multiple openings in the second end portion 62 disposed within the internal air cleaner volume 54 when the fuel system 20 is assembled. As shown in FIG. 6, in some embodiments, the outlet aperture 68 may be disposed in the dirty side 57 of the air cleaner volume 54. In other embodiments, the second end portion 62 of the vent conduit 26 may extend further into the air cleaner housing 24 and the outlet aperture 68 may be disposed in the clean side 58 of the internal air cleaner volume 54.

Fuel vapors that are generated within the fuel tank 22 due to temperature fluctuations, varying fuel level, etc. may be drawn into air cleaner housing 24 by engine vacuum while the internal combustion engine 12 is operating to effectively vent the fuel tank 22 without undue evaporative emissions escaping to atmosphere. The flow of fuel vapor between the fuel tank 22 and the air cleaner housing 24 via the vent conduit 26 is limited by the relatively small size of the inlet aperture 64, the tortuous path of the vent conduit 26 between the inlet aperture 64 and the outlet aperture 68, and the relatively long length of the path of the vent conduit 26 between the inlet aperture 64 and the outlet aperture. These features create a restriction that must be overcome for fuel vapor to flow through the vent conduit 26 from the internal fuel tank volume 32 (e.g., by engine vacuum at the air cleaner). The restriction helps to inhibit the flow of fuel vapor out of the internal fuel tank volume 32 except for when the engine is running and sufficient engine vacuum is present to overcome the restriction. The running loss evaporative emission control provided by the fuel system 20 provides for reduced emissions from the engine 12 without including other relatively expensive emission-reducing mechanisms, such as a providing an activated carbon filter for filtering fuel vapor in the fuel cap 34 or elsewhere on the engine 12. It is believed that the running loss evaporative emission control provided by the fuel system 20 would allow the engine 12 to pass the relevant emission regulations (e.g., those of California) without also including an activated carbon filter with the engine 12.

The fuel tank 22 may be filled with varying levels of fuel, and as discussed above, various environmental and usage characteristics may lead to fuel vapor being generated within the fuel tank 22. As fuel vapor rises within the fuel tank 22 toward the fill neck 30 and fuel cap 34, the fuel vapor enters the inlet aperture 64 provided in the first end portion 60 of the vent conduit 26 extending into the fill neck 30. When the internal combustion engine is running, vacuum within the air cleaner housing 24 draws the fuel vapor through the vent conduit 26. The fuel vapors exit the vent conduit 26 through the outlet aperture 68 and enters the air cleaner housing 24. If the outlet aperture 68 is disposed in the dirty side 57 of the internal air cleaner volume 54, the vacuum pressures draws the fuel vapor through the air filter 56 into the clean side 58, from which it is drawn into the air/fuel mixing apparatus (e.g., carburetor). It can be appreciated that the opening 66 in the housing 24 does not need to provide an air-tight seal against the vent conduit 26, as the vacuum pressure caused by the operation of the engine 12 is sufficient to draw the fuel vapor through the air cleaner housing 24 without allowing fuel vapor to escape through the opening 66 to the atmosphere.

Although the present disclosure has been described with reference to example embodiments, workers skilled in the art will recognize that changes may be made in form and detail without departing from the spirit and scope of the defined subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in technology are foreseeable. The present disclosure described with reference to the example embodiments and set forth in the following definitions is manifestly intended to be as broad as possible. For example, unless specifically otherwise noted, the definitions reciting a single particular element also encompass a plurality of such particular elements.

What is claimed is:

1. An engine, comprising:
   a fuel tank including a fuel tank body defining an internal fuel tank volume for containing a fuel;
   a vent conduit integrally formed with the fuel tank body, the vent conduit extending between an inlet aperture and an outlet aperture, wherein the inlet aperture is in fluid communication with the internal fuel tank volume; and
   an air cleaner system including an air cleaner housing defining an internal air cleaner volume, wherein an opening is formed in the air cleaner housing and the vent conduit extends through the opening;
   wherein the outlet aperture of the vent conduit is positioned within the internal air cleaner volume and the vent conduit provides fluid communication between the internal fuel tank volume and the internal air cleaner volume; and
   wherein the vent conduit establishes direct fluid communication between the internal fuel tank volume and the internal air cleaner volume.

2. The engine of claim 1, wherein the vent conduit extends outward from the fuel tank body.

3. The engine of claim 1, wherein the air cleaner housing comprises a base and a cover and the opening is formed in the base.

4. The engine of claim 1, wherein the air cleaner housing comprises a base and a cover and the opening is formed in the cover.

5. The engine claim 1, further comprising an air filter positioned in the internal air cleaner volume.

6. The engine of claim 5, wherein the air filter defines a dirty side and a clean side of the internal air cleaner volume and the outlet aperture of the vent conduit is positioned within the dirty side of the internal air cleaner volume.

7. The engine of claim 1, wherein the engine does not include an activated carbon filter for filtering fuel vapor emanating from the internal fuel tank volume.

8. The engine of claim 1, wherein the fuel tank does not include a fuel cap having an activated carbon filter for filtering fuel vapor emanating from the internal fuel tank volume.

9. The engine of claim 1, wherein the fuel tank body comprises:
   a top portion including a filler neck extending along a filler neck axis that is angled relative to a vertical axis, and a top portion mounting surface perpendicular to the filler neck axis;
   a bottom portion including a bottom portion mounting surface perpendicular to the filler neck axis;
   wherein the top portion is attached to the bottom portion with the top portion mounting surface engaging the bottom portion mounting surface.

10. The engine of claim 9, wherein the filler neck defines a filler neck internal volume and the inlet aperture of the vent conduit opens to the filler neck internal volume.

11. The engine of claim 1, wherein the fuel tank body includes a filler neck defining a filler neck internal volume and the inlet aperture of the vent conduit opens to the filler neck internal volume.

12. An engine, comprising:
   a fuel tank including a fuel tank body defining an internal fuel tank volume for containing a fuel;
   an air cleaner system including an air cleaner housing defining an internal air cleaner volume; and
   a vent conduit integrally formed with the fuel tank body, wherein the vent conduit establishes direct fluid communication between the internal fuel tank volume and the internal air cleaner volume;
   wherein the engine does not include an activated carbon filter for filtering fuel vapor emanating from the internal fuel tank volume.

* * * * *